US 6,944,724 B2

United States Patent
Chaudhry et al.

(10) Patent No.: US 6,944,724 B2
(45) Date of Patent: Sep. 13, 2005

(54) METHOD AND APPARATUS FOR DECOUPLING TAG AND DATA ACCESSES IN A CACHE MEMORY

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 270 days.

(21) Appl. No.: 10/243,268

(22) Filed: Sep. 13, 2002

(65) Prior Publication Data

US 2003/0056066 A1 Mar. 20, 2003

Related U.S. Application Data

(60) Provisional application No. 60/323,989, filed on Sep. 14, 2001.

(51) Int. Cl.[7] .............................................. G06F 12/00
(52) U.S. Cl. ........................ 711/154; 711/118; 711/122
(58) Field of Search .................................. 711/118, 122, 711/151, 154, 128, 140

(56) References Cited

U.S. PATENT DOCUMENTS

| 4,370,710 A | 1/1983 | Kroft ........................ 364/200 |
| 5,377,345 A | 12/1994 | Chang et al. ................ 395/425 |
| 5,745,729 A | 4/1998 | Greenley et al. ........... 395/458 |
| 6,732,236 B2 * | 5/2004 | Favor ........................ 711/118 |
| 2002/0188821 A1 * | 12/2002 | Wiens et al. ................. 711/220 |

OTHER PUBLICATIONS

Publication entitled "Complexity/Performance Tradeoffs with Non–Blocking Loads," by Keith I. Farkas et al., 8345 Computer Architecture News, Apr. 1994, No. 2, New York, XP000450352, pp. 211–222.

Publication entitled "The Alpha 21264 Microprocessor" by R.E. Kessler., IEEE, Mar.–Apr. 1999, XP000832024, pp. 24–36.

* cited by examiner

*Primary Examiner*—Pierre M. Vital
(74) *Attorney, Agent, or Firm*—Park, Vaughan & Fleming LLP (57) ABSTRACT

One embodiment of the present invention provides a system that decouples a tag access from a corresponding data access within a cache memory. The system operates by receiving a memory request at the cache memory, wherein the memory request includes an address identifying a memory location. Next, the system performs the tag access by looking up at least one tag from a tag array within the cache memory and comparing the at least one tag with a tag portion of the address to determine if a cache line containing the address is located in the cache memory. If the cache line containing the address is located in the cache memory but a data array containing the cache line is busy, the system performs the corresponding data access at a later time when the data array becomes free. Furthermore, if the memory request is for a load operation, the corresponding data access takes place without waiting for preceding load operations to complete.

21 Claims, 4 Drawing Sheets

METHOD AND APPARATUS FOR DECOUPLING TAG AND DATA ACCESSES IN A CACHE MEMORY

RELATED APPLICATIONS

This application hereby claims priority under 35 U.S.C. §119 to U.S. Provisional Patent Application No. 60/323,989, filed on 14 Sep. 2001, entitled "Method and Apparatus for Decoupling Tag and Data Accesses in a Cache Memory," by inventors Shailender Chaudhry and Marc Tremblay.

BACKGROUND

1. Field of the Invention

The present invention relates to the design of cache memories within computer systems. More specifically, the present invention relates to a method and apparatus for decoupling a tag access from a corresponding data access within a cache memory.

2. Related Art

As processor clock speeds continue in increase at an exponential rate, computer system designers are coming under increasing pressure to perform computational operations at faster clock rates. This can be accomplished by "pipelining" computational operations, which involves dividing each computational operational into a number of smaller operations that can be performed within a single clock cycle. Pipelining allows a number of consecutive computational operations to be processed concurrently by feeding them in lockstep through a set of pipeline stages that perform the smaller operations.

One challenge in designing a pipelined computer system is to efficiently handle variable access times to cache memory. In a typical computer system one or more stages of the pipeline are dedicated to accessing cache memory to perform a load operation or a store operation. Unfortunately, cache access times can vary greatly depending upon if the cache access generates a cache hit or a cache miss.

Even during a cache hit, a number of circumstances can cause a cache access to be delayed. For example, when a cache line is returned during a cache miss operation, a cache fill operation takes place to load the cache line into a data array portion of the cache. Unfortunately, this cache fill operation can conflict with a current cache access from the pipeline, causing the current cache access to stall. In another example, a read-after-write (RAW) hazard may arise because a load operation from the pipeline is directed to a cache line with a pending store operation. In this case, the load operation must wait until the pending store operation completes to ensure that the load operation returns the most current value from the cache line.

In order to alleviate the above-described problems, some caches have been designed so that accesses to the tag array of the cache memory are decoupled from accesses to the data array of the cache memory. Note that a typical cache memory performs a tag lookup into a tag array to compare one or more tags from the tag array with a tag portion of the address. This allows the cache to determine if the desired cache line is located in the cache.

If the tag array access is decoupled from the data array access, it is possible to first perform the tag lookup and comparison to determine if the desired cache line is located in the cache. If so, the tag lookup returns the set and way location of the desired cache line within the data array of the cache memory. If the corresponding data array access is delayed due to contention, the corresponding data array access can take place at a later time when the data array becomes free. This data array access uses the set and way location previously determined during the tag lookup. In this way, the tag array access does not have to be repeated for the subsequent data array access. Furthermore, the tag array access takes a fixed amount of time, which can greatly simplify pipeline design, and can thereby improve pipeline performance.

Unfortunately, existing caches that decouple tag and data accesses do not support out-of-order data returns from cache misses during load operations. It is a complicated matter to support out-of-order returns because a cache line that returns during a cache miss must somehow be matched with the cache access that caused the miss and with all other subsequent accesses to the same cache line, and this matching must take place in an efficient manner.

What is needed is a method and an apparatus for decoupling cache a tag access from a corresponding data access within a cache memory in a manner that efficiently supports out-of-order returns of cache lines during cache miss operations.

SUMMARY

One embodiment of the present invention provides a system that decouples a tag access from a corresponding data access within a cache memory. The system operates by receiving a memory request at the cache memory, wherein the memory request includes an address identifying a memory location. Next, the system performs the tag access by looking up at least one tag from a tag array within the cache memory and comparing the at least one tag with a tag portion of the address to determine if a cache line containing the address is located in the cache memory. If the cache line containing the address is located in the cache memory but a data array containing the cache line is busy, the system performs the corresponding data access at a later time when the data array becomes free. Furthermore, if the memory request is for a load operation, the corresponding data access takes place without waiting for preceding load operations to complete.

In one embodiment of the present invention, if the memory request is for a load operation, the system performs the corresponding data access at a later time by storing an entry for the load operation in a load buffer, wherein the entry specifies a location of a corresponding cache line in the data array that was determined during the tag access. When the data array becomes free at a later time, the system uses the entry to perform the load operation from the data array without having to perform the tag access again to determine the location of the cache line in the data array.

In one embodiment of the present invention, if the memory request is for a store operation, the system performs the corresponding data access at a later time by storing an entry for the store operation in a store buffer, wherein the entry specifies a location of a corresponding cache line in the data array that was determined during the tag access. When the data array becomes free at the later time, the system uses the entry to perform the store operation to the data array without having to perform the tag access again to determine the location of the cache line in the data array.

In one embodiment of the present invention, if the memory request is for a load operation that generates a cache miss, system requests the cache line from a lower level of the memory hierarchy and stores an entry for the load operation in a prior miss buffer. The system also selects a target cache location to be filled by the cache line and updates a corresponding target entry in the tag array with the tag portion of the address. Note that updating the target entry involves setting a prior miss bit within the target entry to indicate that the target cache location is associated with an outstanding cache miss operation.

In one embodiment of the present invention, if the memory request generates a cache miss, the system creates an entry for the cache miss within a prior miss buffer. In a variation of this embodiment, performing the tag access additionally involves looking up a prior miss bits associated with the tags. In this variation, if the memory request is for a load operation, if the tag portion of the address matches a tag in the tag array, and if the corresponding prior miss bit is set indicating that an associated cache line is subject to an outstanding cache miss operation, the system stores an entry for the memory request within the prior miss buffer.

In one embodiment of the present invention, upon receiving a returned cache line in satisfaction of an outstanding cache miss operation, the system performs a cache fill operation to insert the returned cache line into the data array. Next, the system completes any memory requests within the prior miss buffer that are waiting for the cache fill operation.

In one embodiment of the present invention, the system arbitrates accesses to the data array between: a prior miss buffer containing memory requests that are waiting for an outstanding cache miss to return; a fill buffer containing cache lines returned by cache miss operations; a computer system pipeline that generates memory requests; a load buffer containing load requests that have been delayed due to contention for the data array; and a store buffer containing store requests that have been delayed due to contention for the data array.

In one embodiment of the present invention, the system blocks cache fill operations that conflict with outstanding cache miss operations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
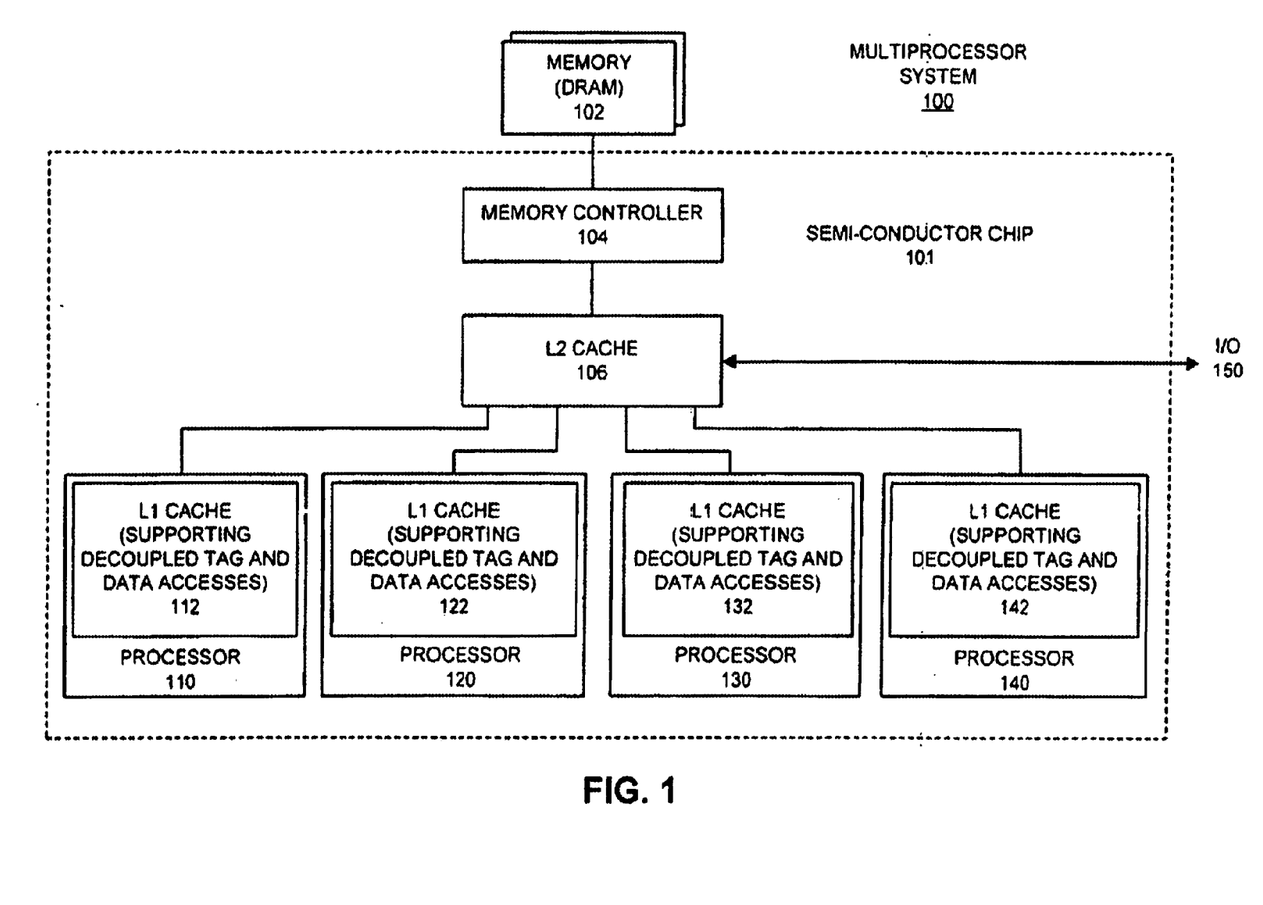
FIG. 1 illustrates a computer system in accordance with an embodiment of the present invention.

FIG. 1 illustrates a computer system 100 in accordance with an embodiment of the present invention. Much of computer system 100 is located within a single semiconductor chip 101. More specifically, semiconductor chip 101 includes a number of processors 110, 120, 130 and 140, which contain level-one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to level-two (L2) cache 106. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data.

Although the present invention is described in the context of a multiprocessor system on a single chip, the present invention is not meant to he limited to a multiprocessor system or to a single chip processor. In general, the present invention can be applied to any type of computer system, including a uniprocessor computer system or a multiprocessor computer system. Moreover, the present invention can be applied to almost any type of cache memory, including as a set-associative cache, a directed-mapped cache, an instruction cache, a data cache, a unified instruction and data cache, a level one (L1) cache or a level two (L2) cache.

Cache Memory

Figure 2:
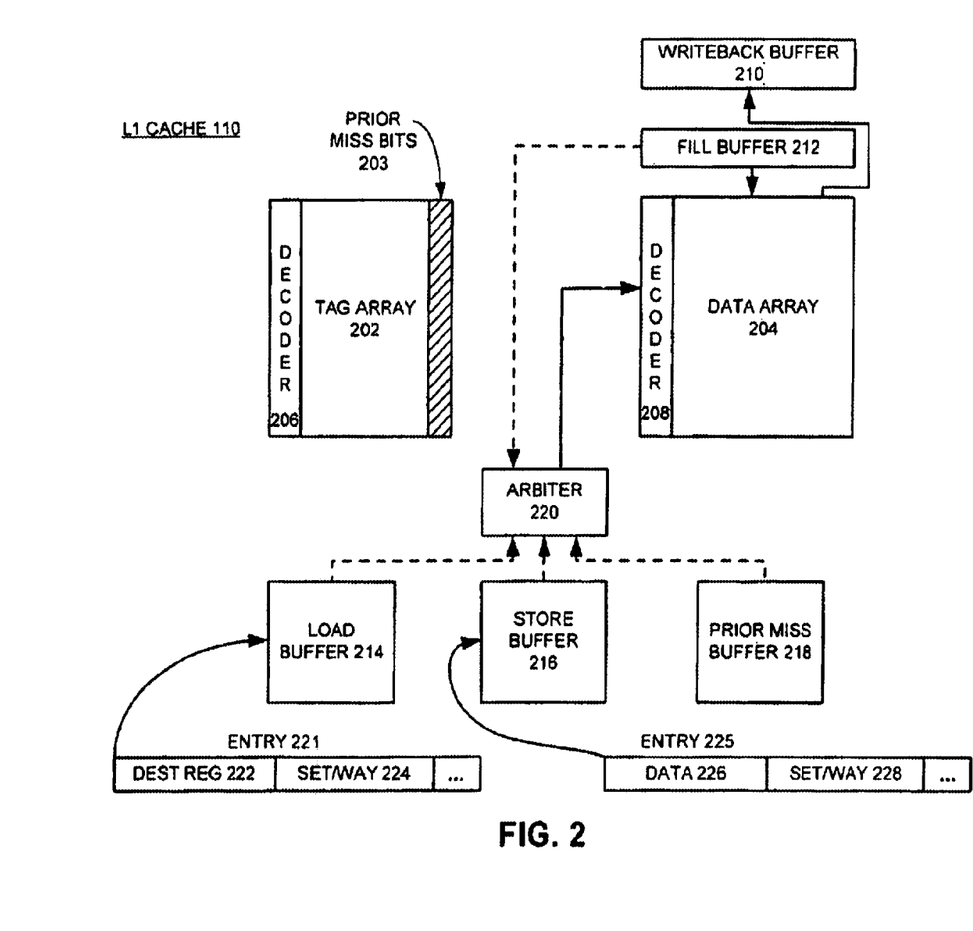
FIG. 2 illustrates a cache memory that supports decoupled accesses to a tag array and a data array in accordance with an embodiment of the present invention.

FIG. 2 illustrates the structure of an L1 cache 110 that supports decoupled accesses to a tag array and a data array in accordance with an embodiment of the present invention.

L1 cache 110 includes a number of conventional cache memory structures, such as tag array 202, data array 204, writeback buffer 210 and fill buffer 212. Tag array 202 contains the tag portion of addresses for lines stored within L1 cache 110. When L1 cache 110 receives a request to perform a memory access to a target address, L1 cache 110 uses the set number of the target address to lookup one or more tags from tag array 202. These tags are compared with the tag portion of the target address to determine whether the cache line containing the target address is located within L1 cache 110.

Not shown in FIG. 2 are the comparator circuits for comparing tags. Also not shown are the multiple tags that are retrieved during a tag lookup for a set-associative cache. Furthermore, note that each entry in tag array 203 includes a prior miss bit 203, which indicates that the tag is associated with an outstanding cache miss.

Data array 204 stores cache lines corresponding to tags stored within tag array 202. During a load operation in conventional cache memories, data array 204 is accessed at the same time that tag array 202 is accessed. If the tag lookup indicates that the load operation is a hit, the data value retrieved from data array 204 is returned to complete the load operation.

Data array 204 communicates with L2 cache 106 through writeback buffer 210 and fill buffer 212. Writeback buffer 210 contains cache lines retrieved from data array 204 that are waiting to be written back to L2 cache 106, while fill buffer 212 contains cache lines retrieved from L2 cache 106 that are waiting to be stored in data array 204.

Note that tag array 202 and data array 204 include separate decoders 206 and 208, respectively. This facilitates decoupled access to tag array 202 and data array 204 by allowing different set number lookups to take place simultaneously in tag array 202 and data array 204.

L2 cache 110 includes a number of new structures that do not exist in conventional cache memories, including load buffer 214, store buffer 216, and prior miss buffer 218. Load buffer 214 and store buffer 216 contain pending accesses to data array 204 that are waiting for data array 204 to become free. More specifically, load buffer 214 contains load requests that have been delayed due to contention for data array 204, and store buffer 216 contains store requests that have been delayed due to contention for data array 204. These structures exist is as consequence of the fact that tag accesses and data accesses are decoupled. This means that a tag access for a load operation or store operation may take place before the corresponding load or store to data array 204 takes place. These "pending" load and store operations are temporarily stored in load buffer 214 and store buffer 216.

Prior miss buffer 218 contains memory requests that are waiting for an outstanding cache miss to return. This includes a memory request that cause a cache miss, as well as subsequent load and store operations to the same cache line that occur before the cache line returns.

A given entry 221 in load buffer 214 contains a destination register identifier 222 and the set and way location 224 of the load operation within data array 204. It also contains other fields which are not shown, such as a field indicating the size of the memory access or a field indicating sign extension options. A given entry 225 in store buffer 216 contains the data 226 to be written to data array 204 during the store operation, as well as the set and way location of the target cache line for the store operation within data array 204. It includes other fields which are not shown. In one embodiment of the present invention, an entry in prior miss buffer 218 is similar to an entry in load buffer 214.

A number of structures require access to data array 204, including load buffer 214, store buffer 216, prior miss buffer 216, fill buffer 212 and the processor pipeline (not shown). These accesses are controlled by arbiter circuit 220, which is described in more detail below with reference to FIG. 3.

Arbitration Circuit

Figure 3:
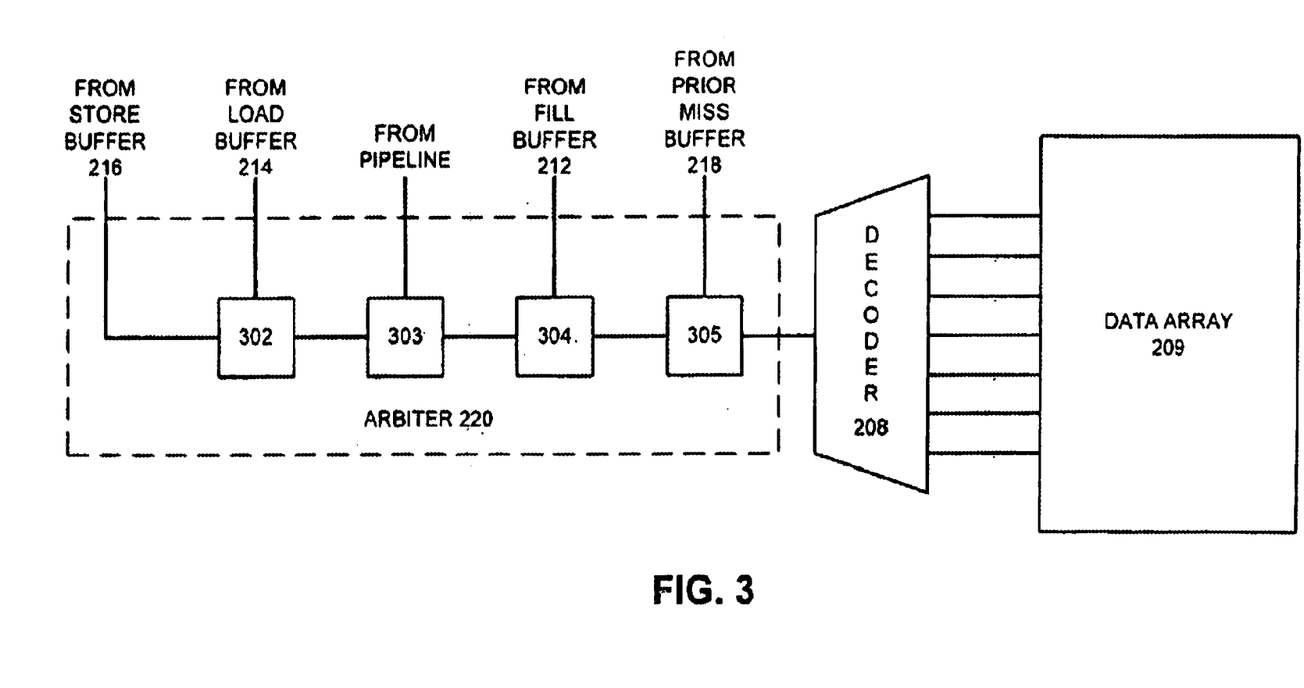
FIG. 3 illustrates an arbitration circuit in accordance with an embodiment of the present invention.

FIG. 3 illustrates the structure of arbiter circuit 220 from FIG. 2 in accordance with an embodiment of the present invention. Arbiter circuit 220 contains a number of switches 302–305 that control access to decoder 208 of data array 204. The highest priority is given to prior miss buffer 218, which is closest to decoder 208, and can therefore use switch 305 to lock out upstream contenders for access to data array 204. Prior miss buffer 218 has the highest priority because it contains accesses that have been waiting for a cache miss. These accesses are likely to cause the processor the block. The next highest priority is given to fill buffer 212, which attempts to return cache lines for cache miss operations. Next in priority is the instruction pipeline followed by load buffer 214. Finally, store buffer 216 is given the lowest priority because store operations can generally take place at a more leisurely pace.

Load and Store Operations

Figure 4:
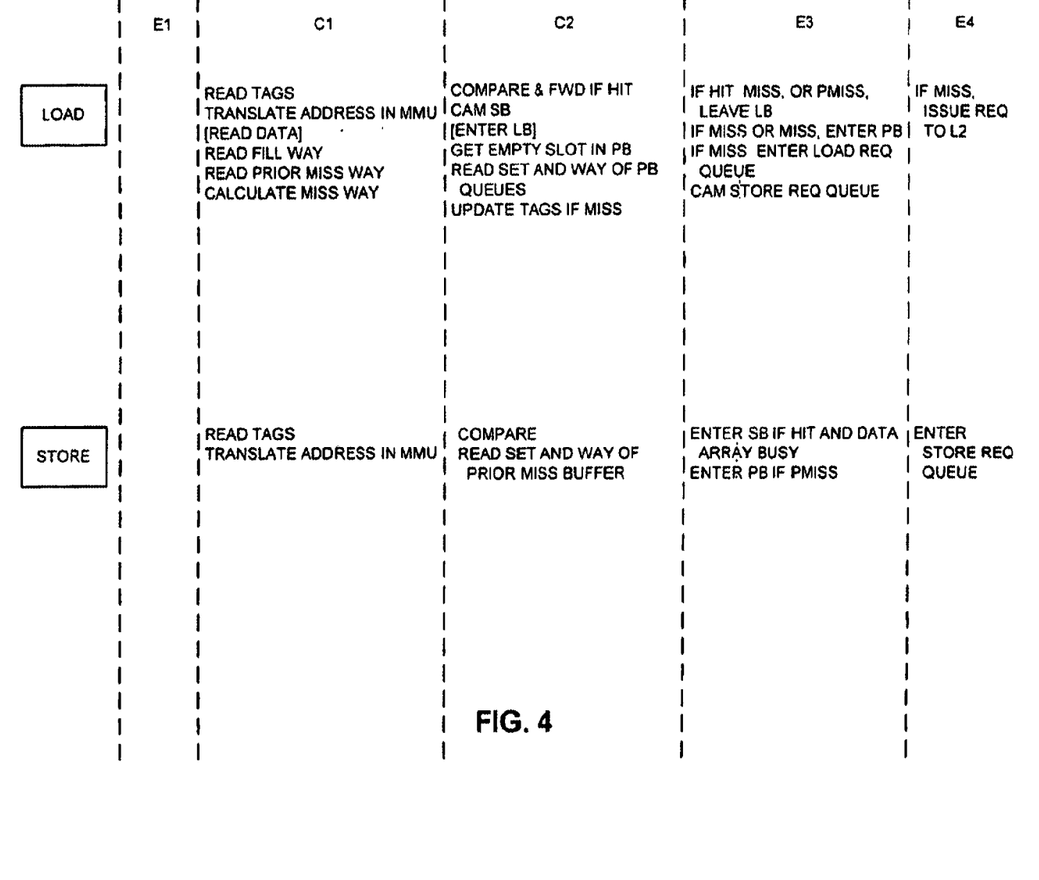
FIG. 4 illustrates how a load operation and a store operation are performed within the cache memory illustrated in FIG. 2 in accordance with an embodiment of the present invention.

FIG. 4 illustrates how a load operation and a store operation are performed within the cache memory 110 illustrated in FIG. 2 in accordance with an embodiment of the present invention. FIG. 4 is organized to show what happens within various pipeline stages. After the instruction fetch and decode pipeline stages, a number of additional stages exist, including stages E1, C1, C2, E4, E5, T and W. More specifically, E1 is an execute stage; C1 and C2 are cache access stages; E4 and E5 are additional execute stages; T is a trap stage; and WB is a write back stage. Note that the present invention can generally be implemented within any type of pipelined computer system and is not meant to be limited to the specific set of stages illustrated in FIG. 4.

The top portion of FIG. 4 illustrates actions that take place during a load operation. During the C1 stage, the system performs a number of operations, including performing a lookup into tag array 202 to read the tags associated with the address. The system also performs a virtual-to-physical address translation through a memory management unit. The system also tries to read the corresponding cache line(s) from data array 204. The system additionally determines whether the load operation has lost the arbitration for data array 204 by reading the fill way and the prior miss way. If either the fill way or the prior miss way are for the same way, the system knows that the execution pipeline has lost the arbitration because arbiter 220 illustrated in FIG. 3 gives priority to fill buffer 212 and prior miss buffer 218. The system also calculates the miss way to identify a line in the cache to replace during a cache miss, if necessary.

During stage C2, the system performs additional operations, including comparing the current tag with the tags retrieved from tag array 202 to determine if the load causes a cache hit. If the load causes a hit, the system loads the data from data array 204. The system also performs a content-addressable search on store buffer 216 to determine if there is a read-after-write (RAW) hazard between the load operation and a preceding store operation. The system also speculatively inserts an entry into load buffer 214 for the load operation. The system additionally identifies an empty slot in prior miss buffer 218 in case a cache miss occurs. The system also reads the set and way of queues within prior miss buffer 218 in case the load has to be entered into prior miss buffer 218. In the case of a cache miss, the system updates the tag to be the new tag and sets the prior miss bit so that subsequent accesses will know a cache miss is outstanding for the cache line.

During stage E4, the system performs additional operations, including removing the speculatively inserted entry from load buffer 214 if the load generated a hit and was able to access data array 204, or if the load generated a miss, a prior miss or a RAW hazard. (Note that the system can determine if a prior miss exists by examining the prior miss bit of the tag array entry.) If the load generates a cache miss or a prior miss, the system enters the load into prior miss buffer 218. Note that prior miss buffer is organized as a set of queues for each outstanding cache miss operation. This allows the system to examine only the head of each queue instead of performing a fully associative search. This decreases the lookup time. If the load generates a cache miss, the system enters the load into a load request queue to pull in the corresponding cache line in from L2 cache 106.

Finally, in stage E4, the system issues a miss, if necessary, to L2 cache 106.

The bottom portion of FIG. 4 illustrates actions that take place during a store operation. During the C1 stage, the system performs and number of operations, including performing a lookup into tag array 202 to read the tags associated with the address. The system also performs a virtual-to-physical address translation through the memory management unit.

During stage C2, the system performs additional operations, including comparing the current tag with the tags retrieved from tag array 202 to determine if there is a cache hit. If there is a hit, the system stores the data to data array 204. The system also reads the set and way information for queues within prior miss buffer 218 in case the store has to be entered into prior miss buffer 218.

During stage E4, the system performs additional operations, including entering the store operation into store buffer 216 if the store was a cache hit but was not able to gain access to data array 204. The system also enters the store into prior miss buffer 218 if the store generates a prior miss.

Finally, during stage E4, the system enters the store into store request queue to store a line to L2 cache 206.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for decoupling a tag access from a corresponding data access within a cache memory, comprising:

receiving a memory request at the cache memory, wherein the memory request includes an address identifying a memory location associated with the memory request; and performing the tag access by looking up at least one tag from a tag array within the cache memory and comparing the at least one tag with a tag portion of the address to determine if a cache line containing the address is located in the cache memory;

wherein if the tag lookup causes a cache hit, because the cache line containing the address is located in the cache memory, but a data array containing the cache line is busy, the method further comprises performing the corresponding data access to the data array at a later time when the data array becomes free;

wherein if the memory request is for a load operation, the corresponding data access takes place without waiting for preceding load operations to complete;

wherein executing the data access without waiting for preceding load operations to complete involves:
attempting to load the data from the data array,
speculatively storing the load operation in a load buffer to anticipate potential contention for the data array, and identifying an empty slot in a prior miss buffer to anticipate a potential cache miss,
wherein these operations are executed in parallel;

wherein performing the corresponding data access at a later time involves:
storing an entry for the load operation in a load buffer, wherein the entry specifies a location of a corresponding cache line in the data array that was determined during the tag access, and
when the data array becomes free at the later time, using the entry to perform the load operation from the data array without having to perform the tag access again to determine the location of the cache line in the data array.

2. The method of claim 1, wherein if the memory request is for a store operation, performing the corresponding data access at a later time involves:
storing an entry for the store operation in a store buffer, wherein the entry specifies a location of a corresponding cache line in the data array that was determined during the tag access; and
when the data array becomes free at the later time, using the entry to perform the store operation to the data array without having to perform the tag access again to determine the location of the cache line in the data array.

3. The method of claim 1, wherein if the memory request is for a load operation that generates a cache miss, the method further comprises:
requesting the cache line from a lower level of the memory hierarchy;
storing an entry for the load operation in a prior miss buffer;
selecting a target cache location to be filled by the cache line; and
updating a corresponding target entry in the tag array with the tag portion of the address;
wherein updating the target entry involves setting a prior miss bit within the target entry to indicate that the target cache location is associated with an outstanding cache miss operation.

4. The method of claim 1, wherein if the memory request generates a cache miss, the method further comprises creating an entry for the cache miss within a prior miss buffer.

5. The method of claim 4,
wherein performing the tag access additionally involves looking up a prior miss bit associated with the at least one tag; and
wherein if the memory request is for a load operation, if the tag portion of the address matches a tag in the tag array, and if the corresponding prior miss bit is set indicating that an associated cache line is subject to an outstanding cache miss operation, the method further comprises storing an entry for the memory request within the prior miss buffer.

6. The method of claim 4, further comprising:
receiving a returned cache line in satisfaction of an outstanding cache miss operation;
performing a cache fill operation to insert the returned cache line into the data array; and
completing memory requests within the prior miss buffer that were waiting for the cache fill operation.

7. The method of claim 1, further comprising arbitrating accesses to the data array between:
a prior miss buffer containing memory requests that are waiting for an outstanding cache miss to return;
a fill buffer containing cache lines returned by cache miss operations;
a computer system pipeline that generates memory requests;
a load buffer containing load requests that have been delayed due to contention for the data array; and
a store buffer containing store requests that have been delayed due to contention for the data array.

8. The method of claim 1, further comprising blocking a cache fill operation to a cache location that is associated with an outstanding cache miss operation.

9. An apparatus that decouples a tag access from a corresponding data access within a cache memory, comprising:
   the cache memory that is configured to receive a memory request, wherein the memory request includes an address identifying a memory location associated with the memory request;
   a tag array within the cache memory;
   a data array within the cache memory;
   a tag access mechanism that is configured to look up at least one tag from the tag array and to compare the at least one tag with a tag portion of the address to determine if a cache line containing the address is located in the cache memory;
   a data array access mechanism within the cache memory, wherein if the tag lookup causes a cache hit, because the cache line containing the address is located in the cache memory, but the data array is busy, the data array access mechanism is configured to perform the corresponding data access to the data array at a later time when the data array becomes free;
   wherein if the memory request is for a load operation, the data array access mechanism is configured to perform the corresponding data access without waiting for preceding load operations to complete;
   wherein executing the data access without waiting for preceding load operations to complete involves:
      attempting to load the data from the data array,
      speculatively storing the load operation in a load buffer to anticipate potential contention for the data array,
   and identifying an empty slot in a prior miss buffer to anticipate a potential cache miss,
      wherein these operations are executed in parallel; and
   further comprising a load buffer that contains load operations from cache hits that are waiting for the data array to become free, wherein if the memory request is for a load operation, the data array access mechanism is configured to perform the corresponding data access at a later time by:
      storing an entry for the load operation in the load buffer, wherein the entry specifies a location of a corresponding cache line in the data array that was determined during the tag access, and
      when the data array becomes free at the later time, using the entry to perform the load operation from the data array without having to perform the tag access again to determine the location of the cache line in the data array.

10. The apparatus of claim 9, wherein the load buffer is organized as a queue.

11. The apparatus of claim 9, further comprising a store buffer containing store operations that are waiting for the data array to become free, wherein if the memory request is for a store operation, the data array access mechanism is configured to perform the corresponding data access at a later time by:
   storing an entry for the store operation in the store buffer, wherein the entry specifies a location of a corresponding cache line in the data array that was determined during the tag access; and
   when the data array becomes free at the later time, using the entry to perform the store operation to the data array without having to perform the tag access again to determine the location of the cache line in the data array.

12. The apparatus of claim 11, wherein the store buffer is organized as a queue.

13. The apparatus of claim 9, wherein if the memory request is for a load operation that generates a cache miss, the data array access mechanism is configured to:
   request the cache line from a lower level of the memory hierarchy;
   store an entry for the load operation in a prior miss buffer;
   select a target cache location to be filled by the cache line; and to
   update a corresponding target entry in the tag array with the tag portion of the address;
   wherein updating the target entry involves setting a prior miss bit within the target entry to indicate that the target cache location is associated with an outstanding cache miss operation.

14. The apparatus of claim 9, wherein if the memory request generates a cache miss, the data array access mechanism is configured to create an entry for the cache miss within a prior miss buffer.

15. The apparatus of claim 14,
   wherein the tag access mechanism is additionally configured to look up a prior miss bit associated with the at least one tag; and
   wherein if the memory request is for a load operation, if the tag portion of the address matches a tag in the tag array, and if the corresponding prior miss bit is set indicating that an associated cache line is subject to an outstanding cache miss operation, the data array access mechanism is configured to create an entry for the memory request within the prior miss buffer.

16. The apparatus of claim 14, further comprising a cache fill mechanism that is configured to:
   receive a returned cache line in satisfaction of an outstanding cache miss operation;
   perform a cache fill operation to insert the returned cache line into the data array; and to
   complete memory requests within the prior miss buffer that were waiting for the cache fill operation.

17. The apparatus of claim 14, wherein the prior miss buffer is organized as a queue.

18. The apparatus of claim 9, further comprising an arbitration mechanism that is configured to arbitrate accesses to the data array between:
   a prior miss buffer containing memory requests that are waiting for an outstanding cache miss to return;
   a fill buffer containing cache lines returned by cache miss operations;
   a computer system pipeline that generates memory requests;
   a load buffer containing load requests that have been delayed due to contention for the data array; and
   a store buffer containing store requests that have been delayed due to contention for the data array.

19. The apparatus of claim 9, wherein the apparatus is configured to block a cache fill operation to a cache location that is associated with an outstanding cache miss operation.

20. An apparatus that decouples a tag access from a corresponding data access within a cache memory, comprising:
   the cache memory;
   a request input within the cache memory that is configured to receive a memory request, wherein the memory request includes an address identifying a memory location associated with the memory request;

a tag array within the cache memory;

a data array within the cache memory;

a tag access mechanism that is configured to look up at least one tag from the tag array and to compare the at least one tag with a tag portion of the address to determine if a cache line containing the address is located in the cache memory;

a data array access mechanism within the cache memory, wherein if the tag lookup causes a cache hit, because the cache line containing the address is located in the cache memory, but the data array is busy, the data array access mechanism is configured to perform the corresponding data access to the data array at a later time when the data array becomes free;

wherein if the memory request is for a load operation, the data array access mechanism is configured to perform the corresponding data access without waiting for preceding load operations to complete;

wherein executing the data access without waiting for preceding load operations to complete involves:
attempting to load the data from the data array,
speculatively storing the load operation in a load buffer to anticipate potential contention for the data array,
and identifying an empty slot in a prior miss buffer to anticipate a potential cache miss,
wherein these operations are executed in parallel;

a prior miss buffer containing memory requests that are waiting for an outstanding cache miss to return;

a fill buffer containing cache lines returned by cache miss operations;

a load buffer containing load requests generated by cache hits that have been delayed due to contention for access to the data array; and a store buffer containing store requests generated by cache hits that have been delayed due to contention for access to the data array.

21. An computer system including a cache memory that decouples a tag access from a corresponding data access, comprising:

a processor;

a memory;

the cache memory coupled between the processor and the memory;

a request input within the cache memory that is configured to receive a memory request, wherein the memory request includes an address identifying a memory location associated with the memory request;

a tag array within the cache memory;

a data array within the cache memory;

a tag access mechanism that is configured to look up at least one tag from the tag array and to compare the at least one tag with a tag portion of the address to determine if a cache line containing the address is located in the cache memory; and a data array access mechanism within the cache memory, wherein if the tag lookup causes a cache hit, because the cache line containing the address is located in the cache memory, but the data array is busy, the data array access mechanism is configured to perform the corresponding data access to the data array at a later time when the data array becomes free;

wherein if the memory request is for a load operation, the data array access mechanism is configured to perform the corresponding data access without waiting for preceding load operations to complete;

wherein executing the data access without waiting for preceding load operations to complete involves:
attempting to load the data from the data array,
speculatively storing the load operation in a load buffer to anticipate potential contention for the data array,
and identifying an empty slot in a prior miss buffer to anticipate a potential cache miss,
wherein these operations are executed in parallel;

wherein performing the corresponding data access at a later time involves:
storing an entry for the load operation in a load buffer, wherein the entry specifies a location of a corresponding cache line in the data array that was determined during the tag access, and
when the data array becomes free at the later time, using the entry to perform the load operation from the data array without having to perform the tag access again to determine the location of the cache line in the data array.

* * * * *